(12) United States Patent
Rafique et al.

(10) Patent No.: US 9,875,464 B2
(45) Date of Patent: Jan. 23, 2018

(54) DYNAMIC PRESENTATION OF CONTEXTUAL BUSINESS COMPONENT DATA

(71) Applicant: Oracle International Corporation, Redwood Shores, CA (US)

(72) Inventors: Arif Rafique, Parker, CO (US); Greg Gravenites, Littleton, CO (US); Carli Gray, Colorado Springs, CO (US); Rajan M. Modi, Highlands Ranch, CO (US); Satish Ramanathan, Westford, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 838 days.

(21) Appl. No.: 13/645,040

(22) Filed: Oct. 4, 2012

(65) Prior Publication Data

US 2014/0101071 A1 Apr. 10, 2014

(51) Int. Cl.
*G06Q 10/10* (2012.01)
*G06F 17/50* (2006.01)

(52) U.S. Cl.
CPC .................... *G06Q 10/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,601,233 | B1* | 7/2003 | Underwood | G06F 8/24 717/100 |
| 2007/0168938 | A1* | 7/2007 | Sturov | H04L 29/12594 717/108 |
| 2009/0083058 | A1* | 3/2009 | Beringer | G06Q 10/10 705/348 |
| 2009/0112655 | A1* | 4/2009 | Stuhec | G06Q 10/0633 705/7.27 |
| 2009/0271511 | A1* | 10/2009 | Peracha | G06F 11/3419 709/224 |
| 2012/0143879 | A1* | 6/2012 | Stoitsev | G06F 17/30528 707/749 |
| 2014/0006520 | A1* | 1/2014 | Buecheler | G06Q 20/00 709/206 |

* cited by examiner

*Primary Examiner* — Mark A Fleischer
(74) *Attorney, Agent, or Firm* — Kilpatrick Townsend & Stockton LLP

(57) ABSTRACT

Various arrangements for organizing business components for use in creating a business object are presented. A selection of a business context may be received from a plurality of business contexts. After receiving the selection of the business context, for each business component of the plurality of business components, whether the business component is within the received business context or outside of the received business context may be determined. An indicator may be assigned to each business component of the plurality of business components based on the business component being determined as being within the received business context or outside of the received business context. Each business component of the plurality of business components with the business component's assigned indicator may be presented.

20 Claims, 8 Drawing Sheets

DYNAMIC PRESENTATION OF CONTEXTUAL BUSINESS COMPONENT DATA

BACKGROUND OF THE INVENTION

Business objects are a data model that allow data to be exchanged effectively and efficiently between applications. Business objects, also referred to as enterprise business objects (EBOs), may be exchanged between various applications and can serve to facilitate process flows that involve multiple different applications. In creating a business object, a developer may structure the business object in accordance with the type of business of the developer's enterprise and/or the enterprise's geographic region, to name only two examples. Typically, a developer may have limited tools available for determining the applicability of particular subelements available to the developer to construct the business object.

SUMMARY OF THE INVENTION

Various arrangements for organizing business components for use in creating a business object are presented. In some embodiments, a method for organizing business components for use in creating a business object is presented. The method may include receiving, by a computer system, a selection of a business context from a plurality of business contexts. The method may include, after receiving the selection of the business context, determining, by the computer system, for each business component of a plurality of business components, whether the business component is within the received business context or outside of the received business context. Each business component of the plurality of business components may include a category, and an association with a business context from the plurality of business contexts. The method may include assigning, by the computer system, an indicator to each business component of the plurality of business components based on the business component being determined as being within the received business context or outside of the received business context. The method may include presenting, by the computer system, each business component of the plurality of business components with the business component's assigned indicator. At least business components within the received business context may be available for use in creating the business object.

Embodiments of such a method may include one or more of the following: The business context may indicate a specific industry or geographic location. The plurality of business contexts may be organized as a hierarchy, such that at least one business context has at least one child business context. The method may include, for each business component of the plurality of business components that is determined to be within the received business context, determining if the business component has an ancestor business component in the hierarchy. The method may include, for each business component of the plurality of business components that is determined to be outside the received business context, determining if the business component has an ancestor business component in the hierarchy. Assigning the indicator to each business component of the plurality of business components may include: assigning, by the computer system, a first type of indicator to business components of the plurality of business components that are within the received business context and do not have an ancestor business component in the hierarchy; assigning, by the computer system, a second type of indicator to business components of the plurality of business components that are within the received business context and have an ancestor business component in the hierarchy; assigning, by the computer system, a third type of indicator to business components of the plurality of business components that are outside the received business context and do not have an ancestor business component in the hierarchy; and/or assigning, by the computer system, a fourth type of indicator to business components of the plurality of business components that are outside the received business context and have an ancestor business component in the hierarchy.

Embodiments of such a method may additionally or alternatively include one or more of the following: Presenting each business component of the plurality of business components with the business component's assigned indicator may include presenting each business component of the plurality of business components with either the assigned first type of indicator, the assigned second type of indicator, the assigned third type of indicator, or the assigned fourth type of indicator. The method may include, after presenting each business component of the plurality of business components with the business component's assigned indicator, receiving, by the computer system, a second selection of a second business context from the plurality of business contexts. The method may include after receiving the selection of the business context, determining, by the computer system, for each business component of the plurality of business components, whether the business component is within the received business context or outside of the second received business context. The method may include assigning, by the computer system, a modified indicator to each business component of the plurality of business components based on the business component being determined as being within the second received business context or outside of the second received business context. The method may include presenting, by the computer system, each business component of the plurality of business components with the business component's assigned modified indicator. The method may include receiving, by the computer system, a selection of a business component that is within the received business context for use in creating the business object. Each indicator may be a graphical element displayed within a user interface.

In some embodiments, a computer program product residing on a non-transitory processor-readable medium for organizing business components for use in creating a business object is presented. The computer program product may include processor-readable instructions configured to cause a computer system to receive a selection of a business context from a plurality of business contexts. The computer program product may include processor-readable instructions configured to cause the computer system to, after receiving the selection of the business context, determine, for each business component of a plurality of business components, whether the business component is within the received business context or outside of the received business context. Each business component of the plurality of business components may include a category and an association with a business context from the plurality of business contexts. The computer program product may include processor-readable instructions configured to cause the computer system to assign an indicator to each business component of the plurality of business components based on the business component being determined as being within the received business context or outside of the received business context. The computer program product may include processor-readable instructions configured to cause the computer system to cause each business component of the plurality of business components with the business component's assigned indicator to be presented. At least business components within the received business context may be available for use in creating the business object.

Embodiments of such a computer program product may include one or more of the following: The business context may indicate a specific industry or geographic location. The plurality of business contexts may be organized as a hierarchy, such that at least one business context has at least one child business context. The computer program product may further include processor-readable instructions configured to cause the computer system to, for each business component of the plurality of business components that is determined to be within the received business context, determine if the business component has an ancestor business component in the hierarchy. The computer program product may further include processor-readable instructions configured to cause the computer system to, for each business component of the plurality of business components that is determined to be outside the received business context, determine if the business component has an ancestor business component in the hierarchy. The processor-readable instructions configured to cause the computer system to assign the indicator to each business component of the plurality of business components may include processor-readable instructions configured to cause the computer system to: assign a first type of indicator to business components of the plurality of business components that are within the received business context and do not have an ancestor business component in the hierarchy; assign a second type of indicator to business components of the plurality of business components that are within the received business context and have an ancestor business component in the hierarchy; assign a third type of indicator to business components of the plurality of business components that are outside the received business context and do not have an ancestor business component in the hierarchy; and/or assign a fourth type of indicator to business components of the plurality of business components that are outside the received business context and have an ancestor business component in the hierarchy.

Embodiments of such a computer program product may additionally or alternatively include one or more of the following: The processor-readable instructions configured to cause the computer system to present each business component of the plurality of business components with the business component's assigned indicator may include processor-readable instructions configured to cause the computer system to cause each business component of the plurality of business components to be presented with either the assigned first type of indicator, the assigned second type of indicator, the assigned third type of indicator, or the assigned fourth type of indicator. The computer program product may further include processor-readable instructions configured to cause the computer system to after causing each business component of the plurality of business components with the business component's assigned indicator to be presented, receive a second selection of a second business context from the plurality of business contexts. The computer program product further comprises processor-readable instructions configured to cause the computer system to, after receiving the selection of the business context, determine for each business component of the plurality of business components, whether the business component is within the received business context or outside of the second received business context. The computer program product further comprises processor-readable instructions configured to cause the computer system to assign a modified indicator to each business component of the plurality of business components based on the business component being determined as being within the second received business context or outside of the second received business context. The computer program product further comprises processor-readable instructions configured to cause the computer system to cause each business component of the plurality of business components with the business component's assigned modified indicator to be presented. The computer program product may further include processor-readable instructions configured to cause the computer system to receive a selection of a business component that is within the received business context for use in creating the business object. Each indicator may be a graphical element displayed within a user interface.

In some embodiments, a system for organizing business components for use in creating a business object is presented. The system may include a processor. The system may include a memory communicatively coupled with and readable by the processor and having stored therein processor-readable instructions. When the processor-readable instructions are executed by the processor, the processor-readable instructions may cause the processor to receive a selection of a business context from a plurality of business contexts. The processor-readable instructions may cause the processor to, after receiving the selection of the business context, determine, for each business component of a plurality of business components, whether the business component is within the received business context or outside of the received business context. Each business component of the plurality of business components may include a category and an association with a business context from the plurality of business contexts. The processor-readable instructions may cause the processor to assign an indicator to each business component of the plurality of business components based on the business component being determined as being within the received business context or outside of the received business context. The processor-readable instructions may cause the processor to cause each business component of the plurality of business components with the business component's assigned indicator to be presented. At least business components within the received business context may be available for use in creating the business object. The processor-readable instructions may further include processor-readable instructions configured to cause the processor to: after causing each business component of the plurality of business components with the business component's assigned indicator to be presented, receive a second selection of a second business context from the plurality of business contexts; after receiving the selection of the business context, determine for each business component of the plurality of business components, whether the business component is within the received business context or outside of the second received business context; assign a modified indicator to each business component of the plurality of business components based on the business component being determined as being within the second received business context or outside of the second received business context; and cause each business component of the plurality of business components with the business component's assigned modified indicator to be presented.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
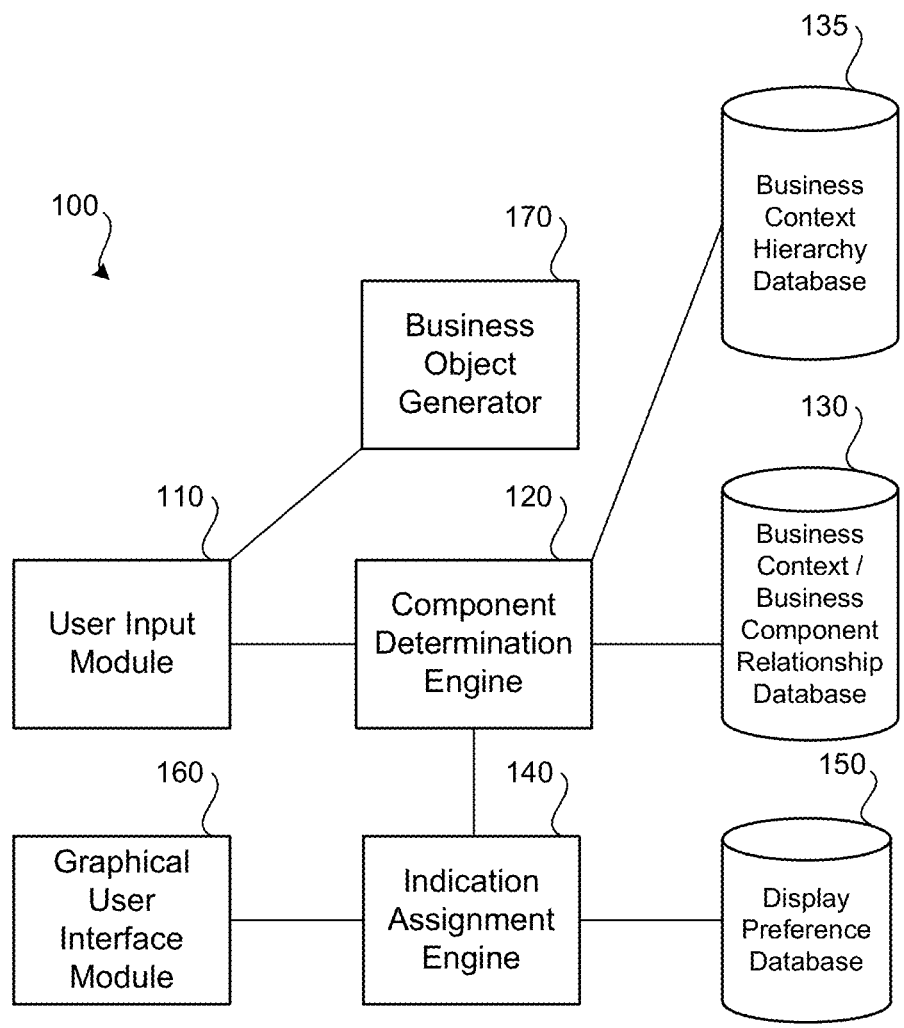
FIG. 1 illustrates an embodiment of a system for organizing business components for use in creating a business object.

A developer may use various business components to create and structure a business object. Each business component may be predefined for a type of data and a category of data. Depending on factors such as an enterprise's type of business and the enterprise's geographic location, different business components may be used to create business objects. As a simplified example, a business component may be for a mailing code. For enterprises within the United States, this mailing code business component may correspond to a zip code and may be required to be a particular length of digits, such as 5 or 9 digits. However, in a different geographic region, the business component corresponding to a mailing code may correspond to a 5, 6, or 7 character mix of letters and numbers. When creating a business object, the developer may desire to use the mailing code business component relevant for the enterprise's geographic region. As such, the developer may benefit from a graphical user interface that distinguishes business components that are considered within the context of the enterprise from business components that are considered outside the context of the enterprise.

A "business object" refers to a data model that is constructed of business components. A business object may be used for exchanging data between different computerized applications or other data sources and data sinks. Business objects may be application agnostic, meaning the data within the business object is based on categories of data that are used across multiple applications. An application may create a business object, as defined by a developer, which is then output to another application. This second application can then use the business object and the business components that are part of the business object to perform a process involving the business object or components of the business object.

A "business component" refers to a data element that may have a type of data and/or a category of data. Business components may be used to construct business objects. An example of a business component may be an address business component. The category of this business component may be "address" and the data type may be string. An example of a business object may be a sales order that includes multiple organized business components, such as an address business component, a postal code business component, a name business component, etc.

A "business context" refers to the conditions surrounding an enterprise. The business context for an enterprise may refer to the business area of the enterprise. For example, a business area may be insurance or communications. The business context may also refer to the geographical region where an enterprise is based and/or operates. For example, a geographical region business context may be the United States. Other forms of business context are also possible.

When creating or modifying a business object, the developer may use various business components in constructing the business object. Based on a business context of the enterprise for which the developer is creating the business object, the developer may use a particular subset of the available business components. How business components are presented to the developer may vary according to business context. Based on the developer's selection of a business context, an indication of whether a business component is available for use by the developer or is not available for use by the developer may be presented. Such an indication may be a non-textual graphical element (e.g., an icon). As such, at a glance, based on the developer's selection of a business context, the developer can ascertain which of the business components are available to the developer for use in creating or modifying a business object.

Business contexts may be arranged in a hierarchy such that based on a business context's position within the hierarchy, the availability of a business component to a developer is determined. Business components that are within the business context selected by the developer may be available for use in creating a business object and referred to as "in-context." Business components that are within an ancestor business context of a business component selected by the developer may be available for use in creating a business object and referred to as "derived-context." Business components that are within an ancestor business context of a business component selected by the developer and are also within the business context selected by the developer may be available and referred to as "in-context with override." Business components that are not within an ancestor business context of a business component selected by the developer and are not within the business context selected by the developer may not be available for use by the developer in creating the business object and may be referred to as "out-of-context." If a developer selects a different business context, which business components are classified as in-context, derived-context, in-context with override, and out-of-context may change. By selecting a different business context, the developer may be accessing business components that are not typically used within the developer's enterprise's business and may result in the business component behaving differently or having properties other than expected by the developer and/or applications with which the business object will be used.

Based on whether a business component is classified as in-context, derived-context, in-context with override, or out-of-context, how the business component is presented to the developer may vary. The developer may be presented with a graphical user interface that allows for selection of business components for use in creating a business object. For each listed business component, an indication may be present that denotes whether the business component is in-context, derived-context, in-context with override, or out-of-context. A business component may not be permitted to be part of multiple of these categories simultaneously for a particular business context. The indication for each business component may be a non-textual graphical indication, such as an icon (or lack of icon) that is displayed to the developer as associated with the business component.

Such graphical distinctions between business components that are presented to the developer may allow the developer to quickly and easily distinguish between business components that are available and not available for use in creating (and/or modifying business objects). Further, the developer may be easily able to distinguish which business components are from within the particular business context selected by the developer, from within an ancestor business context, or are from within the particular business context selected by the developer and differs from a same-named business component that is within an ancestor business context.

FIG. 1 illustrates an embodiment of a system 100 for organizing business components for use in creating a business object. System 100 may include user input module 110, component determination engine 120, business context/business component relationship database 130, business context hierarchy database 135, indication assignment engine 140, display preference database 150, graphical user interface module 160, and business object generator 170. System 100 is depicted as a block-diagram of modules. It should be understood that such modules may be divided into additional modules or the functionality of modules may be combined into fewer modules. Modules may be implemented using computerized hardware, software, firmware, or some combination thereof. Various modules and/or functions of modules may be performed using a computer system, such as computer system 800 of FIG. 8.

User input module 110 may be configured to receive input from a developer. A developer may refer to a user that is using system 100 to interact with business components. A developer may be using the business components to create or modify a business object for an enterprise. User input module 110 may be used by the developer to select a particular business context. The selected business context may be provided to component determination engine 120 by user input module 110. User input module 110 may receive input from a developer using various interfaces, such as a mouse, keyboard, touchscreen, gesture, etc. Further, it should be understood that system 100 may be used to interact with a remote developer. As such, user input module 110 may be configured to receive input from a developer using a computerized device from a remote location, such as across a network.

Component determination engine 120 may receive an indication of the selected business context from user input module 110. Based on the selected business context, component determination engine 120 may determine which business components are in-context, out-of-context, in a derived-context, and/or in-context with override. In order to perform this determination, a database that relates business components to business contexts may be accessed. Additionally, a database that defines the relationship between various business contexts may be accessed.

Business context/business component relationship database 130 may be stored using a computer-readable storage medium. Business context/business component relationship database 130 may serve to identify which business components are members of which business contexts. As an example, Table 1 lists five possible business components and indicates the business context with which each business component is associated.

TABLE 1

| Business Component | Business Context |
|---|---|
| Address | Core |
| Date | Core |
| Claim Number | Insurance |
| Data Rate | Communications |
| Part No. | Communications |

Based on the indicated business context in business context/business component relationship database 130, component determination engine 120 may determine which business components are in-context and out-of-context of the business context selected by the developer.

Figure 2:
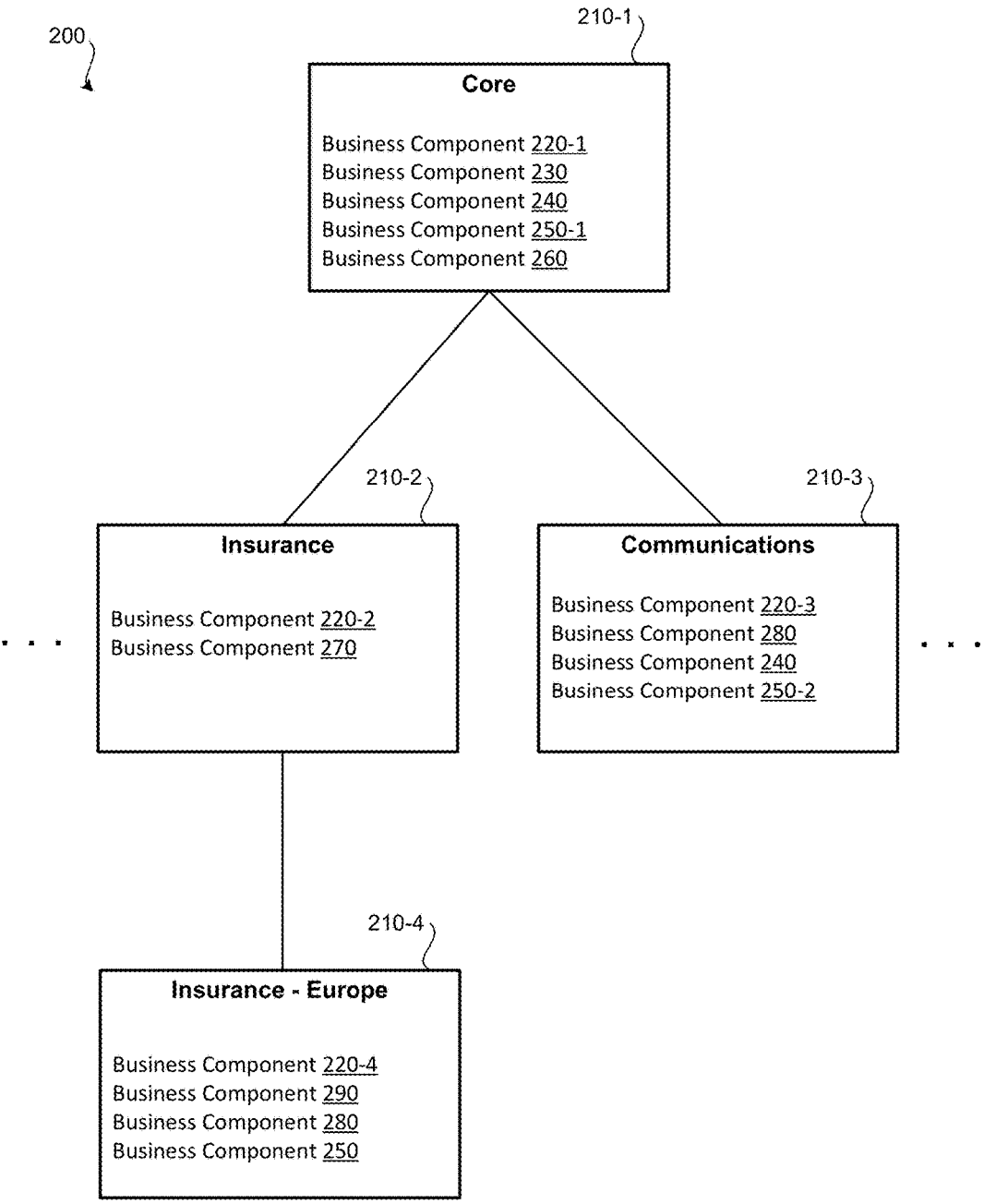
FIG. 2 illustrates a graphical representation of an embodiment of a hierarchy of business components according to business context.

Business contexts may be related in a hierarchal structure, as defined in relation to FIG. 2. If a business component is not present in a particular business context, the business component may still be accessible while the current business context is selected via an ancestor business context. Similarly, a business component may be present in both a selected business context and an ancestor business context. In order to determine the hierarchy of various business contexts, business context hierarchy database 135 may be accessed by component determination engine 120. Business context hierarchy database 135 may be stored using a computer-readable storage medium. Business context hierarchy database 135 may define the relationships of various business contexts. Business contexts may be ancestors or siblings of other business contexts. As a simple example referring to Table 1, if the "core" business context is an ancestor of the "insurance" business context and the developer selects the insurance business context, the developer may have access to the business components associated with the business contexts of insurance and core. It should be understood that business context hierarchy database 135 and business context/business component relationship database 130 may be combined into a single database that defines the relationship among business contexts and between business contexts and business components.

Based on whether a business component is determined to be in-context, out-of-context, in-context with override, or derived-context, indication assignment engine 140 may assign an indicator to each business component. Each context category may have a different type indicator. In some embodiments, a different non-textual graphical element (e.g., an icon) is used to denote each type of business context relationship. In other embodiments, different forms of indication may be used, such as highlighting, colors, bolding, text size, text location, separate lists, etc. To determine which and how the indications are to be presented to the developer, indication assignment engine 140 may consult display preference database 150. User preferences, such as the colors or icons assigned to each category of business context/business component relationship may be defined within display preference database 150.

Graphical user interface module 160 may be used to present the business components along with the indicators representative of the business context/business component relationship that exists for each business component. From graphical user interface module 160 in conjunction with user input module 110, a developer may be permitted to select or otherwise use business components for use in creating a business object. If a business component is out-of-context, and thus possibly not available for use by the developer, the business component may not be permitted to be selected via graphical user interface module 160. Such a business component may or may not be displayed by graphical user interface module 160. If a developer selects a different business context, the indicators displayed with some or all business components may change.

The developer may select a business component for use in creating a business object using graphical user interface module 160 and user input module 110. The business component may be manipulated or otherwise used by the developer in conjunction with business object generator 170. Business object generator 170 may create business objects that serve as how data is exchanged between enterprise applications. For instance data may be output or input to an application in the form of a business object.

FIG. 2 illustrates a graphical representation of an embodiment of a hierarchy 200 of business components according to business context. Such a hierarchal arrangement may be stored as part of business context hierarchy database 135 of FIG. 1 or in some other storage arrangement that may be used to determine a hierarchal structure of business contexts and the associated business components. Referring to the graphical representation of hierarchy 200, a simplified hierarchal structure of business contexts and business components associated with the business contexts is illustrated. In graphical representation of hierarchy 200, four business contexts are illustrated. These business contexts include industry areas (insurance, communications) and geographical areas (Europe). These are meant to be examples only, other business contexts may also exist.

In the graphical representation of hierarchy 200, business context 210-1 is the direct ancestor of business context 210-2 and business context 210-3. Business context 210-1 is also an ancestor of business context 210-4. For example, a business component for "credit card number" may be available on all business contexts that have business context 210-1 as an ancestor.

If business context 210-2 is selected by a developer, each component within business context 210-2 may be available as "in-context." Therefore, as an example, business component 270 may be available to the developer. Business components that are members of an ancestor business context of business context 210-1 may be available to the developer as "derived-context" business components. For example, business component 240 is not present in business context 210-2, but is present in business context 210-1, and is thus available when business context 210-2 has been selected by the developer. Business component 280 is not in business context 210-2, nor is it present in any ancestor business context of business context 210-2 (in this example, business context 210-1). Therefore, business component 280 may be indicated as "out-of-context" if the developer has selected business context 210-2. Business component 220 has two versions present: business component 220-1 present in business context 210-1 and business component 220-2 present in business context 210-2. As such, a version of business component 220 is present in both business context 210-2 and business context 210-1.

If the developer has selected business context 210-2, business component 220-2 may be available as "in-context with override," which indicates that a different version of the business component is present within an ancestor business context of business context 210-2. However, if business context 210-3 was selected by the user, business component 220-3 would be available as "in-context with override." If the developer has selected business context 210-2, business component 250-1 may be available as in the "derived context," while if the developer has selected business context 210-3, business component 250-2 may be available as "in-context with override."

Multiple levels of the hierarchy may be present. Business context 210-4 is a business context that has business context 210-2 and business context 210-1 as its ancestors. Multiple business components (280, 290) may be available as in-context and may not be available in at least some other business contexts. Business component 280 is available as in-context within both business context 210-3 and business context 210-4. Business component 260 may be available as "derived context" to business context 210-4 because business component 260 is present in an ancestor business context (210-1) but not within business context 210-4. Business component 220-4 of business context 210-4 may be available within business context 210-4 as "in-context with override."

It should be understood that business components 220-290 and business contexts 210 are provided as examples only to illustrates the hierarchal structure of business components and how each category of business component/business context can be determined. Embodiments of hierarchal structures of business components and business contexts may be significantly more complex is other embodiments.

Figure 3:
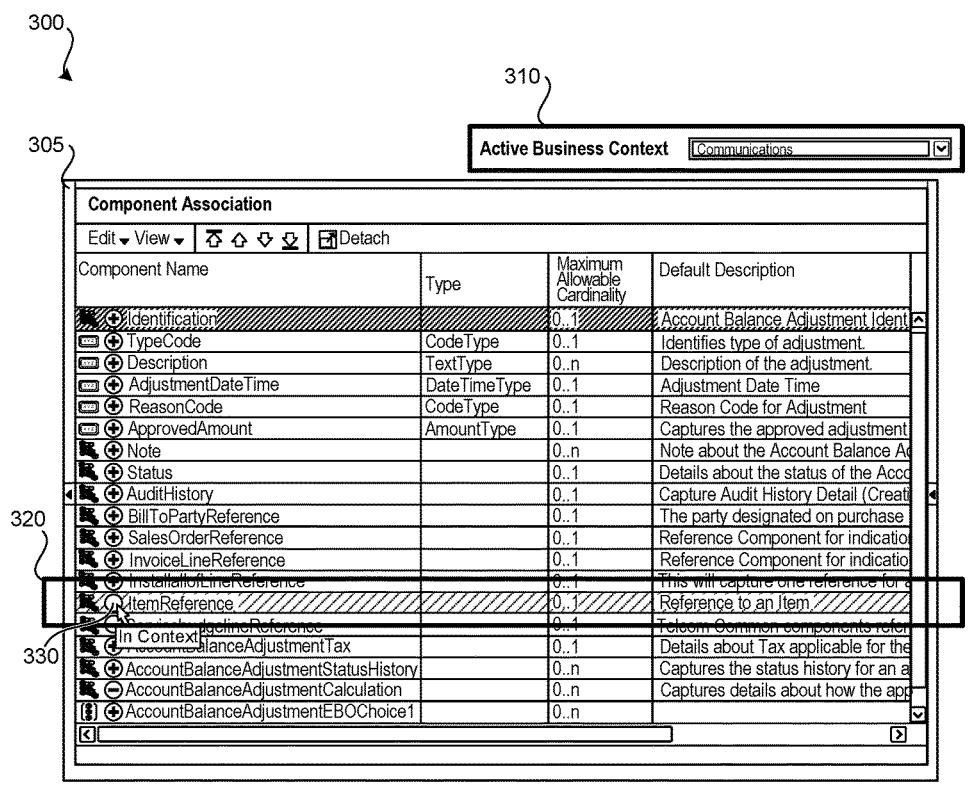
FIG. 3 illustrates an embodiment of a graphical user interface that organizes business components for use in creating a business object.

FIG. 3 illustrates an embodiment of a graphical user interface 300 organizing business components for use in creating a business object. Graphical user interface 300 may be presented to the developer via graphical user interface module 160 of FIG. 1 or some other system configured to present a graphical user interface to a developer. In graphical user interface 300, a developer has selected a business context 310 of "Communications." Business components may be presented via business component display 305 to the developer. When the developer has selected a business context 310, business component display 305 may be updated to provide indications with each business component that indicates whether the business component is in-context or out-of-context. More specifically, business component display 305 may be updated to provide indications with each business component that indicates whether the business component is 1) in-context, 2) in a derived-context, 3) in-context with override; or 4) out-of-context. In some embodiments, non-textual graphical elements, such as non-textual graphical element 330, may be used to indicate the association between a business component and the selected business context. In the illustrated embodiment, an empty circle refers to a business component being "in-context" with the selected business context. Business component 320, which is an "ItemReference" business component, is in-context with the communications business context, as selected. Additional information about business components may be presented within business component display 305, such as: types of business components, a maximum allowable cardinality, and a description of the business component. Other forms of data may also be presented via business component display 305 to the developer.

Figure 4:
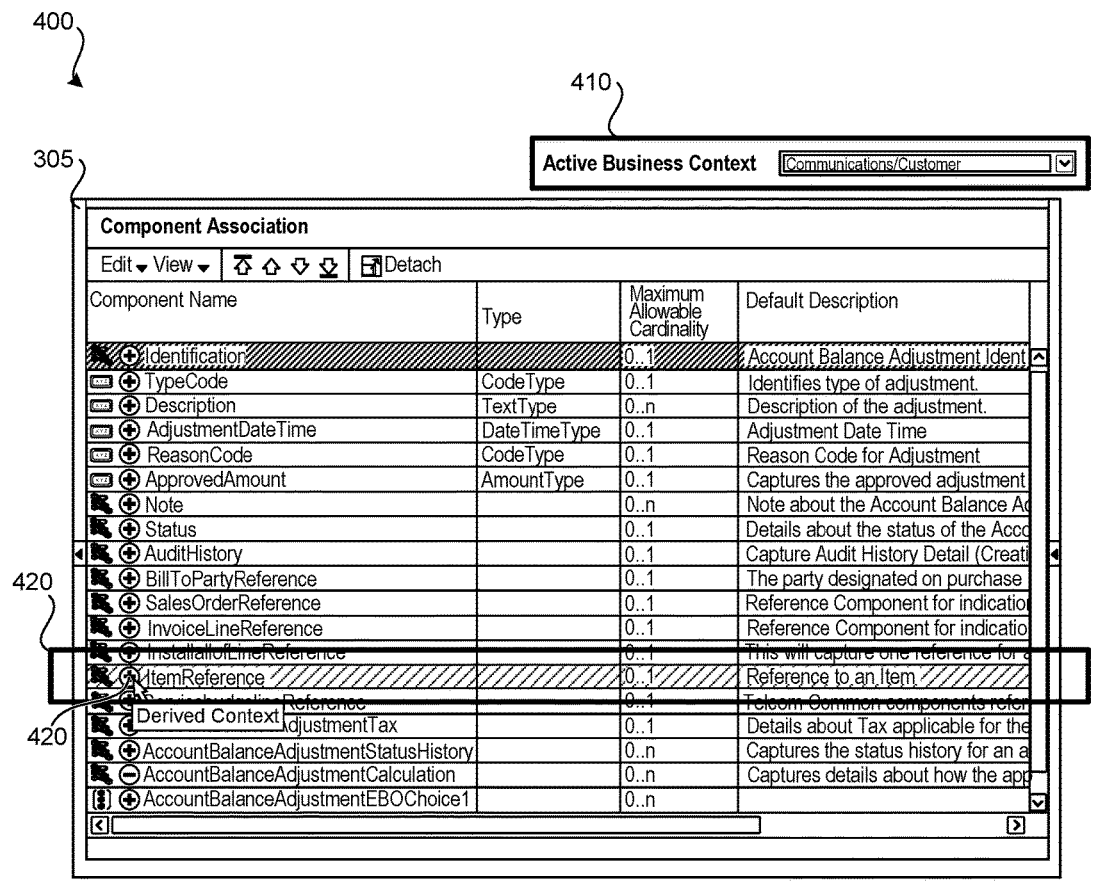
FIG. 4 illustrates another embodiment of a graphical user interface that organizes business components for use in creating a business object with a different business context selected.

FIG. 4 illustrates another embodiment of a graphical user interface 400 organizing business components for use in creating a business object with a different business context selected than in graphical user interface 300 of FIG. 3. In graphical user interface 400, a developer has selected a business context 310 of "communications/customer." The "communications/customer" business context may have the communications business context as an ancestor. When the developer has selected "communications/customer" as the business context 310, business component display 305 may be updated to provide indications with each business component that indicates whether the business component is in-context or out-of-context. More specifically, business component display 305 may be updated to provide indications with each business component that indicates whether the business component is 1) in-context, 2) in a derived-context, 3) in-context with override; or 4) out-of-context.

In the illustrated embodiment of graphical user interface 400, a circle with a plus sign refers to a business component being in a "derived-context" with the selected business context. Business component 320, which is the "ItemReference" business component as selected in graphical user interface 300 of FIG. 3, is in a derived context because "ItemReference" is a member of an ancestor business context of the "communications/customer" business context.

Figure 5:
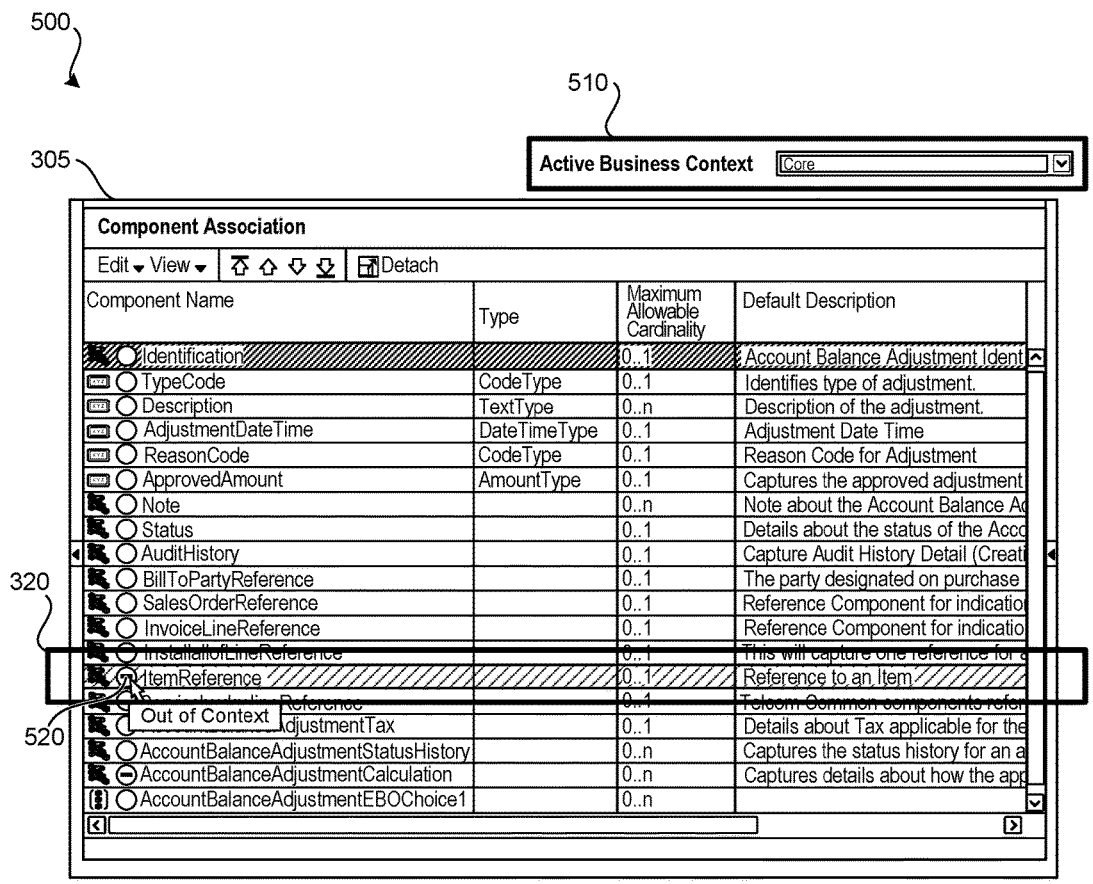
FIG. 5 illustrates another embodiment of a graphical user interface that organizes business components for use in creating a business object with a third business context selected.

FIG. 5 illustrates another embodiment of a graphical user interface 500 organizing business components for use in creating a business object with a different business context selected than in graphical user interface 300 of FIG. 3 or graphical user interface 400 of FIG. 4. In graphical user interface 500, a developer has selected a business context 310 of "core." The "core" business context may not have another business context as an ancestor. When the developer has selected "core" as the business context 310, business component display 305 may be updated to provide indications with each business component that indicates whether the business component is in-context or out-of-context. More specifically, business component display 305 may be updated to provide indications with each business component that indicates whether the business component is 1) in-context, 2) in a derived-context, 3) in-context with override; or 4) out-of-context.

In the illustrated embodiment of graphical user interface 500, a circle with a minus sign refers to a business component being "out-of-context" with the selected business context. Business component 320, which is the "ItemReference" business component as selected in graphical user interface 300 of FIG. 3 and graphical user interface 400 of FIG. 4, is out-of-context because "ItemReference" is neither a member of the core business context nor a member of an ancestor business context of the "core" business context (the core business context may have no ancestors).

While only three non-textual graphical elements have been described, a separate non-textual graphical element may be present for "in-context with override" business components. Alternatively, such business components may use the same non-textual graphical element as "in-context" business components. Further, it should be understood that the graphical user interfaces of FIGS. 3 through 5 are for example purposes only. In other embodiments, various components may be presented in a different format. Further, other embodiments may present more or less information simultaneously.

Figure 6:
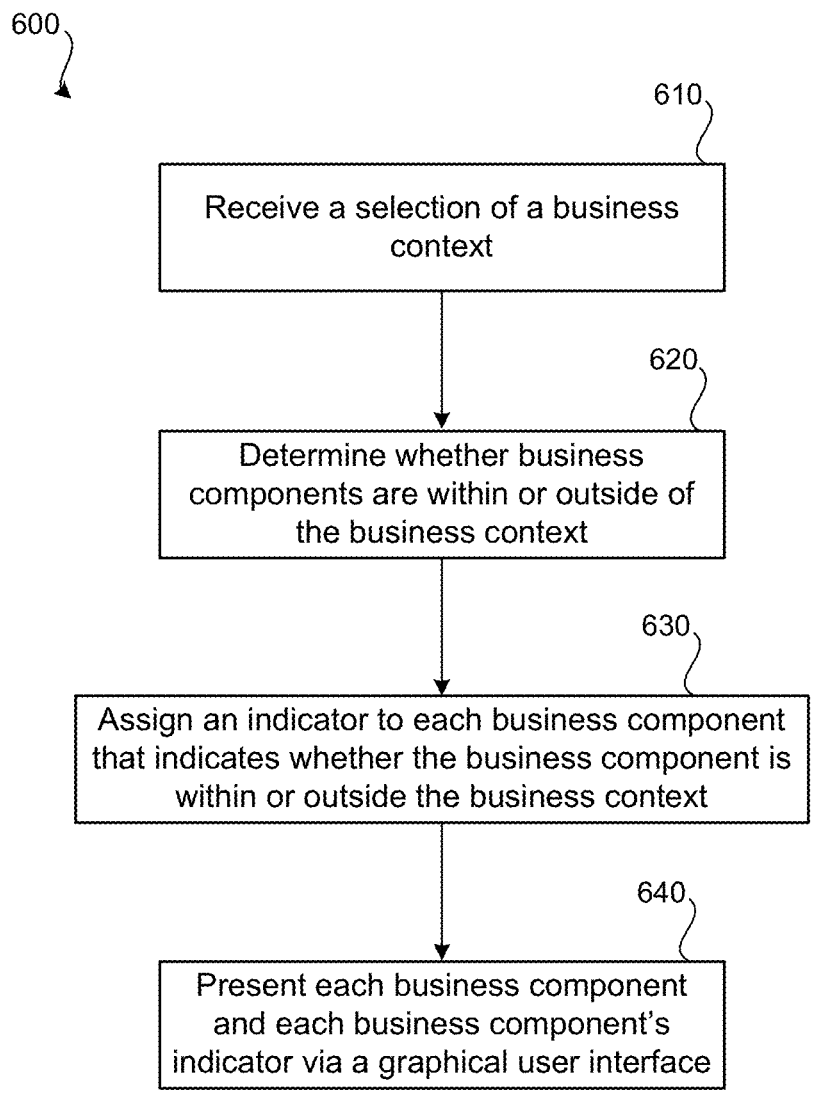
FIG. 6 illustrates an embodiment of a method for organizing business components for use in creating a business object.

FIG. 6 illustrates an embodiment of a method 600 for organizing business components for use in creating a business object. Method 600 may be performed using system 100 of FIG. 1 or some other system configured for organizing business components for use in creating a business object. Method 600 may involve the use of a hierarchal structure of business contexts, such as that illustrated in relation to hierarchy 200 of FIG. 2. Further, method 600 may involve use of graphical user interfaces the same or similar to those illustrated and described in relation to FIGS. 3 through 5. Method 600 may be performed using a computer system, such as computer system 800 of FIG. 8. Means for performing each step of method 600 include computerized devices.

At step 610, within an interface configured to allow the creation of business objects, a selection of a business context may be received. the selection of the business context may be received from a developer. The business context selected may indicate a context of an enterprise on whose behalf a developer is creating (or modifying) a business object. Examples of business contexts includes types of industry and geographical/geopolitical regions. The developer may select a business context from a predefined list of business contexts. In some embodiments, the selection may occur via a user input module, such as user input module 110 of FIG. 1. The selection may be made from a drop-down menu, such as illustrated in graphical user interface 300 of FIG. 3.

At step 620, a determination may be made as to whether each business component of a group of business components is within or outside of the business context selected at step 610. Referring to system 100 of FIG. 1, component determination engine 120 may access business context/business component relationship database 130 to determine a relationship between the selected business context and each business component. Further, component determination engine 120 may access business context hierarchy database 135 to determine the relationship between the selected business context and other business contexts.

At step 630, an indicator may be assigned to each business component. Each indication may denote whether a particular business component is in-context or out-of-context. If "in-context," the business component may be available for use in creating or modifying a business object by the developer. If "out-of-context," the business component may not be available for use in creating or modifying a business object by the developer. In some embodiments, it may be possible for the developer to perform steps to move or copy a business component into a different business context. Each indication may be non-textual and may be graphical. For instance, an icon may be displayed with each business component to denote whether the business component is in- or out-of-context based on the business context selection of step 610.

At step 640, each business component of the group of business components may be presented with its associated indicator as part of a graphical user interface. The indicators may serve to inform the developer of whether the corresponding business component is in- or out-of-context. FIGS. 3-5 illustrate examples of indicators being displayed with business components to denote whether the business component is within the context or outside the context of the selected business context.

Figure 7:
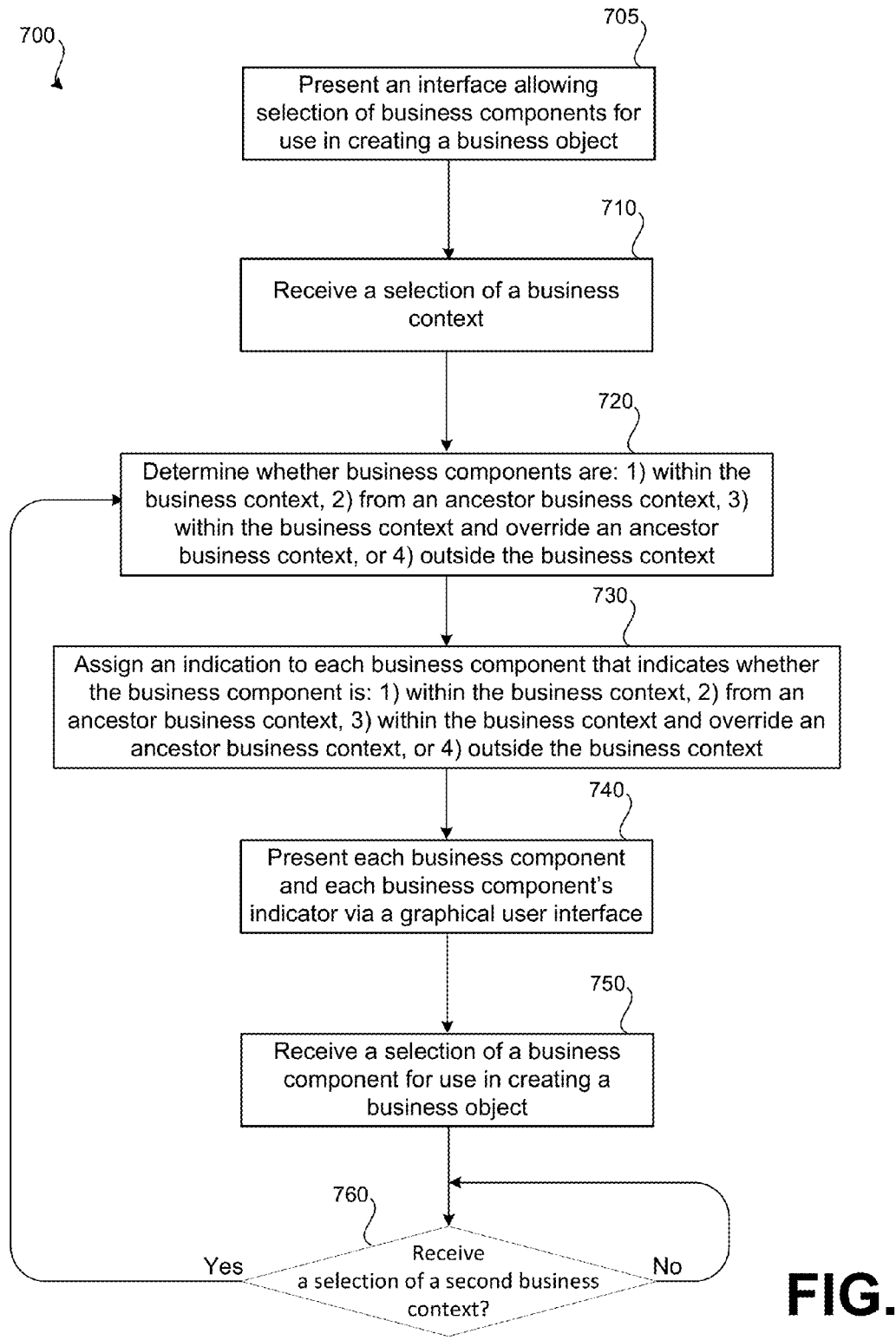
FIG. 7 illustrates another embodiment of a method for organizing business components for use in creating a business object.

FIG. 7 illustrates another embodiment of a method for organizing business components for use in creating a business object. Method 700 may be performed using system 100 of FIG. 1 or some other system configured for organizing business components for use in creating a business object. Method 700 may involve the use of a hierarchal structure of business contexts, such as that illustrated in relation to hierarchy 200 of FIG. 2. Further, method 700 may involve use of graphical user interfaces the same or similar to those illustrated and described in relation to FIGS. 3 through 5. Method 700 may be performed using a computer system, such as computer system 800 of FIG. 8. Means for performing each step of method 700 include computerized devices. Method 700 may represent a more detailed embodiment of method 600 of FIG. 6.

At step 705, a graphical user interface may be presented that allows for selection of one or more business components for use in creating a business object. Each business component may be a data element that has a type of data and/or a category of data. For example, a data element may have a category of a credit card number and a data type number.

At step 710, within the interface configured to allow the creation of business objects, a selection of a business context may be received. The selection of the business context may be received from a developer. The business context selected may indicate a context of an enterprise on whose behalf a developer is creating (or modifying) a business object. Examples of business contexts include types of industry and geographical/geopolitical regions. The developer may select a business context from a predefined list of business contexts. In some embodiments, the selection may occur via a user input module, such as user input module 110 of FIG. 1. The selection may be made from a drop-down menu, such as illustrated in graphical user interface 300 of FIG. 3.

At step 720, a determination may be made as to whether each business component of a group of business components is within or outside of the business context selected at step 710. More specifically, a determination may be made as to whether each business component is: in-context (exists in the current business context and not in an ancestor business context of the business context); in-context with override (exists in the current business context and in another form in an ancestor business context of the business context); derived context (does not exist in the current business context but does in an ancestor business context of the business context); or out-of-context (does not exist in the current business context and does not exist in an ancestor business context of the business context). If a business component is determined to be within the selected business context, it may be determined if the business component has an ancestor business component in an ancestor business context of the selected business context (which would make the business component in-context with override). If a business component is determined to not be within the selected business context, it may be determined if the business component has an ancestor business component in an ancestor business context of the selected business context (which would make the business component of the derived context). In some embodiments, fewer or greater types of business component and business context relationships may exist. Referring to system 100 of FIG. 1, component determination engine 120 may access business context/business component relationship database 130 to determine a relationship between the selected business context and each business component. Further, component determination engine 120 may access business context hierarchy database 135 to determine the relationship between the selected business context and other business contexts.

At step 730, an indicator may be assigned to each business component. Each indication may denote whether a particular business component is in-context, in-context with override, derived context, or out-of-context. If "in-context," "in-context with override," or "derived-context" the business component may be available for use in creating or modifying a business object by the developer. If "out-of-context," the business component may not be available for use in creating or modifying a business object by the developer. In some embodiments, it may be possible for the developer to perform steps to move or copy a business component into a different business context. Each indication may be non-textual and may be graphical. For instance, an icon may be displayed with each business component to denote whether the business component is in- or out-of-context based on the business context selection of step 610. In some embodiments: a circle denotes "in-context" and "in-context with override," a circle with a plus sign denotes "derived context," and a circle with a minus sign denotes "out-of-context."

At step 740, each business component of the group of business components may be presented with its associated indicator as part of a graphical user interface. The indicators may serve to inform the developer of whether the corresponding business component is in-context, in-context with override, derived context, or out-of-context. FIGS. 3-5 illustrate examples of indicators being displayed with business components to denote whether the business component is within the context or outside the context of the selected business context.

At step 750, a business component may be selected and may be used in creating or modifying a business object. The business component selected at step 750 may be a business component that is available for use in creating a business object, such as a business component that is in-context, in-context with override, or derived-context.

At step 760, the developer may select a different business context. When a different business context is selected, steps 720 through 740 may be performed again, which may result in at least some of the business components beings associated with different indications. For example, a business component that was previously out-of-context may now be in-context following selection of the second business context.

Figure 8:
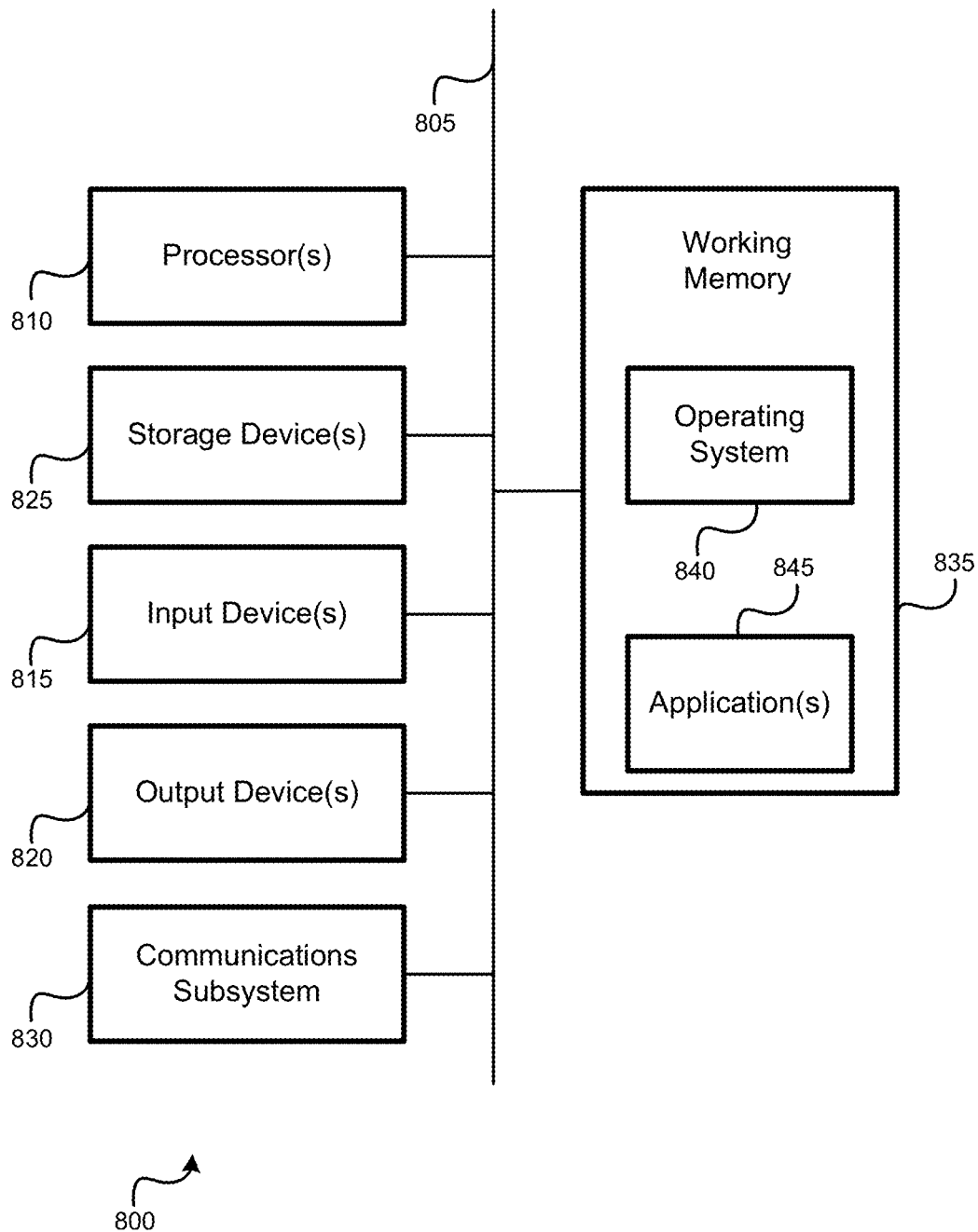
FIG. 8 illustrates an embodiment of a computer system.

FIG. 8 illustrates an embodiment of a computer system. A computer system as illustrated in FIG. 8 may incorporate part of the previously described computerized devices. For example, computer system 800 can represent at least some of the components of system 100 discussed in this application. FIG. 8 provides a schematic illustration of one embodiment of a computer system 800 that can perform the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), which then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Several example configurations, various modifications, alternative constructions, and equivalents having been described may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the scope of the claims is not bound by the above description.

What is claimed is:

1. A method for organizing business components for use in creating a business object, the method comprising:
    presenting, by a computer system, a graphical user interface of a first application, the graphical user interface allowing selection of one or more business components from a plurality of business components for creating a business object;
    receiving, by the computer system, a selection of a business context from the graphical user interface, the business context being selected from a plurality of business contexts;
    after receiving the selection of the business context, determining, by the computer system, for each business component of the plurality of business components, whether the business component is within the received business context or outside of the received business context by querying a database containing relationships of business components to business contexts, wherein:
        each business component of the plurality of business components comprises:
            a category,
            a data type, and
            an association with a business context from the plurality of business contexts;
    assigning, by the computer system, a first indicator to each business component of the plurality of business components that was determined to be within the received business context, the first indicator identifying the business component as being within the received business context;
    assigning, by the computer system, a second indicator to each business component of the plurality of business components that was determined to be outside of the received business context, the second indicator identifying the business component as being outside of the received business context;
    presenting, by the computer system in the graphical user interface, each business component of the plurality of business components with a visual indication of the business component's assigned indicator, wherein at least business components that are assigned the first indicator are available for use in creating the business object;
    receiving, by the computer system, a selection of one or more business components from the graphical user interface, each of the one or more business components in the selection being within the received business context;
    generating, by the computer system, the business object using the one or more business components in the selection of the one or more business components; and
    outputting, by the computer system, the business object for use by a second application.

2. The method for organizing business components for use in creating the business object of claim 1, wherein the business context indicates a specific industry or geographic location.

3. The method for organizing business components for use in creating the business object of claim 2, wherein the plurality of business contexts is organized as a hierarchy, such that at least one business context has at least one child business context.

4. The method for organizing business components for use in creating the business object of claim 3, further comprising:
    for each business component of the plurality of business components that is determined to be within the received business context, determining if the business component has an ancestor business component in the hierarchy; and
    for each business component of the plurality of business components that is determined to be outside the received business context, determining if the business component has an ancestor business component in the hierarchy.

5. The method for organizing business components for use in creating the business object of claim 4, wherein assigning the first indicator to each business component of the plurality of business components that was determined to be within the received business context comprises:
    assigning, by the computer system, a first type of first indicator to business components of the plurality of business components that are within the received business context and do not have an ancestor business component in the hierarchy; and
    assigning, by the computer system, a second type of first indicator to business components of the plurality of business components that are within the received business context and have an ancestor business component in the hierarchy; and
    wherein assigning the second indicator to each business component of the plurality of business components that was determined to be outside the received business context comprises:

assigning, by the computer system, a first type of second indicator to business components of the plurality of business components that are outside the received business context and do not have an ancestor business component in the hierarchy; and assigning, by the computer system, a second type of second indicator to business components of the plurality of business components that are outside the received business context and have an ancestor business component in the hierarchy.

6. The method for organizing business components for use in creating the business object of claim 5, wherein presenting each business component of the plurality of business components with the business component's assigned indicator comprises presenting each business component of the plurality of business components with either the assigned first type of first indicator, the assigned second type of first indicator, the assigned first type of second indicator, or the assigned second type of second indicator.

7. The method for organizing business components for use in creating the business object of claim 1, further comprising:

after presenting each business component of the plurality of business components with the business component's assigned indicator, receiving, by the computer system, a second selection of a second business context from the plurality of business contexts;

after receiving the second selection of the business context, determining, by the computer system, for each business component of the plurality of business components, whether the business component is within the second received business context or outside of the second received business context;

assigning, by the computer system, the first indicator to each business component of the plurality of business components that was determined to be within the second received business context, the first indicator being modified to identify the business component as being within the second received business context;

assigning, by the computer system, the second indicator to each business component of the plurality of business components that was determined to be outside of the second received business context, the second indicator being modified to identify the business component as being outside of the second received business context; and presenting, by the computer system in the graphical user interface, each business component of the plurality of business components with a visual indication of the business component's assigned modified indicator.

8. The method for organizing business components for use in creating the business object of claim 1, the method further comprising:

receiving, by the computer system, a selection of a business component that is within the received business context for use in creating the business object.

9. The method for organizing business components for use in creating the business object of claim 1, wherein each first and second indicator is a graphical element displayed within the graphical user interface.

10. A computer program product residing on a non-transitory processor-readable medium for organizing business components for use in creating a business object, the computer program product comprising processor-readable instructions configured to cause a computer system to:

present a graphical user interface of a first application, the graphical user interface allowing selection of one or more business components from a plurality of business components for creating a business object;

receive a selection of a business context from the graphical user interface, the business context being selected from a plurality of business contexts;

after receiving the selection of the business context, determine, for each business component of the plurality of business components, whether the business component is within the received business context or outside of the received business context by querying a database containing relationships of business components to business contexts, wherein:

each business component of the plurality of business components comprises:

a category, a data type, and an association with a business context from the plurality of business contexts;

assign a first indicator to each business component of the plurality of business components that was determined to be within the received business context, the first indicator identifying the business component as being within the received business context;

assign a second indicator to each business component of the plurality of business components that was determined to be outside the received business context, the second indicator identifying the business component as being outside of the received business context;

cause each business component of the plurality of business components and a visual indication of the business component's assigned indicator to be presented in the graphical user interface, wherein at least business components that are assigned the first indicator are available for use in creating the business object;

receive a selection of one or more business components from the graphical user interface, each of the one or more business components in the selection being within the received business context;

generating the business object using the one or more business components in the selection of the one or more business components; and output the business object for use by a second application.

11. The computer program product for organizing business components for use in creating the business object of claim 10, wherein the business context indicates a specific industry or geographic location.

12. The computer program product for organizing business components for use in creating the business object of claim 11, wherein the plurality of business contexts is organized as a hierarchy, such that at least one business context has at least one child business context.

13. The computer program product for organizing business components for use in creating the business object of claim 12, wherein the computer program product further comprises processor-readable instructions configured to cause the computer system to:

for each business component of the plurality of business components that is determined to be within the received business context, determine if the business component has an ancestor business component in the hierarchy; and for each business component of the plurality of business components that is determined to be outside the received business context, determine if the business component has an ancestor business component in the hierarchy.

14. The computer program product for organizing business components for use in creating the business object of claim 13, wherein the processor-readable instructions configured to cause the computer system to assign the first indicator to each business component of the plurality of business components that was determined to be within the received business context comprises processor-readable instructions configured to cause the computer system to:
  assign a first type of first indicator to business components of the plurality of business components that are within the received business context and do not have an ancestor business component in the hierarchy; and
  assign a second type of first indicator to business components of the plurality of business components that are within the received business context and have an ancestor business component in the hierarchy; and
  wherein the processor-readable instructions configured to cause the computer system to assign the second indicator to each business component of the plurality of business components that was determined to be outside the received business context comprises processor-readable instructions configured to cause the computer system to:
    assign a first type of second indicator to business components of the plurality of business components that are outside the received business context and do not have an ancestor business component in the hierarchy; and
    assign a second type of second indicator to business components of the plurality of business components that are outside the received business context and have an ancestor business component in the hierarchy.

15. The computer program product for organizing business components for use in creating the business object of claim 14, wherein the processor-readable instructions configured to cause the computer system to present each business component of the plurality of business components with the business component's assigned indicator comprises processor-readable instructions configured to cause the computer system to:
  cause each business component of the plurality of business components to be presented with either the assigned first type of first indicator, the assigned second type of first indicator, the assigned first type of second indicator, or the assigned second type of second indicator.

16. The computer program product for organizing business components for use in creating the business object of claim 10, wherein the computer program product further comprises processor-readable instructions configured to cause the computer system to:
  after causing each business component of the plurality of business components with the business component's assigned indicator to be presented, receive a second selection of a second business context from the plurality of business contexts;
  after receiving the second selection of the business context, determine for each business component of the plurality of business components, whether the business component is within the second received business context or outside of the second received business context;
  assign the first indicator to each business component of the plurality of business components that was determined to be within the second received business context, the first indicator being modified to identify the business component as being within the second received business context;
  assign the second indicator to each business component of the plurality of business components that was determined to be outside of the second received business context, the second indicator being modified to identify the business component as being outside of the second received business context; and
  cause each business component of the plurality of business components and a visual indication of the business component's assigned modified indicator to be presented in the graphical user interface.

17. The computer program product for organizing business components for use in creating the business object of claim 10, wherein the computer program product further comprises processor-readable instructions configured to cause the computer system to:
  receive a selection of a business component that is within the received business context for use in creating the business object.

18. The computer program product for organizing business components for use in creating the business object of claim 10, wherein each first and second indicator is a graphical element displayed within the graphical user interface.

19. A system for organizing business components for use in creating a business object, the system comprising:
  a processor; and
  a memory communicatively coupled with and readable by the processor and having stored therein processor-readable instructions which, when executed by the processor, cause the processor to:
    present a graphical user interface of a first application, the graphical user interface allowing selection of one or more business components from a plurality of business components for creating a business object;
    receive a selection of a business context from the graphical user interface, the business context being selected from a plurality of business contexts;
    after receiving the selection of the business context, determine, for each business component of a plurality of business components, whether the business component is within the received business context or outside of the received business context by querying a database containing relationships of business components to business contexts, wherein:
      each business component of the plurality of business components comprises:
        a category,
        a data type, and
        an association with a business context from the plurality of business contexts;
    assign a first indicator to each business component of the plurality of business components that was determined to be within the received business context, the first indicator identifying the business component as being within the received business context;
    assign a second indicator to each business component of the plurality of business components that was determined to be outside the received business context, the second indicator identifying the business component as being outside of the received business context;
    cause each business component of the plurality of business components and a visual indication of the business component's assigned indicator to be presented in the graphical user interface, wherein at least business components that are assigned the first indicator are available for use in creating the business object;

receive a selection of one or more business components from the graphical user interface, each of the one or more business components in the selection being within the received business context;

generate the business object using the one or more business components in the selection of the one or more business components; and output the business object for use by a second application.

20. The system for organizing business components for use in creating the business object of claim 19, wherein the processor-readable instructions further comprise processor-readable instructions configured to cause the processor to:

after causing each business component of the plurality of business components with the business component's assigned indicator to be presented, receive a second selection of a second business context from the plurality of business contexts;

after receiving the second selection of the business context, determine for each business component of the plurality of business components, whether the business component is within the second received business context or outside of the second received business context;

assign the first indicator to each business component of the plurality of business components that was determined to be within the second received business context, the first indicator being modified to identify the business component as being within the second received business context;

assign the second indicator to each business component of the plurality of business components that was determined to be outside of the second received business context; and cause each business component of the plurality of business components and a visual indication of the business component's assigned modified indicator to be presented in the graphical user interface.

\* \* \* \* \*

UNITED STATES PATENT AND TRADEMARK OFFICE
CERTIFICATE OF CORRECTION

PATENT NO. : 9,875,464 B2
APPLICATION NO. : 13/645040
DATED : January 23, 2018
INVENTOR(S) : Rafique et al.

Page 1 of 1

It is certified that error appears in the above-identified patent and that said Letters Patent is hereby corrected as shown below:

In Column 12, Line 13, delete "received. the" and insert -- received. The --, therefor.

Signed and Sealed this
Twenty-first Day of August, 2018

Andrei Iancu
*Director of the United States Patent and Trademark Office*